United States Patent [19]

McEwan

[11] Patent Number: 5,512,834
[45] Date of Patent: Apr. 30, 1996

[54] HOMODYNE IMPULSE RADAR HIDDEN OBJECT LOCATOR

[75] Inventor: Thomas E. McEwan, Livermore, Calif.

[73] Assignee: The Regents of the University of California, Oakland, Calif.

[21] Appl. No.: 305,104

[22] Filed: Sep. 13, 1994

Related U.S. Application Data

[63] Continuation-in-part of Ser. No. 58,398, May 7, 1993, Pat. No. 5,457,394.

[51] Int. Cl.$^6$ .......................... G01S 13/04; G01R 27/00; G01R 29/02; G01V 3/17
[52] U.S. Cl. ...................... 324/642; 324/67; 342/27; 342/94
[58] Field of Search .................. 324/207.26, 67, 324/326, 329, 337, 533, 637, 642–646; 342/22, 27, 94, 134, 135, 459; 340/552–554

[56] References Cited

U.S. PATENT DOCUMENTS

| | | | |
|---|---|---|---|
| 3,392,384 | 7/1968 | Wesch | 324/337 |
| 3,806,795 | 4/1974 | Morey | 324/6 |
| 3,967,282 | 6/1976 | Young et al. | 343/5 |
| 4,028,707 | 6/1977 | Young et al. | 343/719 |
| 4,052,666 | 10/1977 | Fletcher et al. | 324/644 |
| 4,062,010 | 12/1977 | Young et al. | 343/5 |
| 4,072,942 | 2/1978 | Alongi | 324/337 X |
| 4,381,544 | 4/1983 | Stamm | 324/337 X |
| 4,905,008 | 2/1990 | Kawano | 342/22 |
| 4,983,914 | 1/1991 | Baranski | 324/207.26 X |

FOREIGN PATENT DOCUMENTS 2238201  11/1989  United Kingdom .

*Primary Examiner*—Gerard R. Strecker
*Attorney, Agent, or Firm*—Henry P. Sartorio

[57] ABSTRACT

An electromagnetic detector is designed to locate an object hidden behind a separator or a cavity within a solid object. The detector includes a PRF generator for generating 2 MHz pulses, a homodyne oscillator for generating a 2 kHz square wave, and for modulating the pulses from the PRF generator. A transmit antenna transmits the modulated pulses through the separator, and a receive antenna receives the signals reflected off the object. The receiver path of the detector includes a sample and hold circuit, an AC coupled amplifier which filters out DC bias level shifts in the sample and hold circuit, and a rectifier circuit connected to the homodyne oscillator and to the AC coupled amplifier, for synchronously rectifying the modulated pulses transmitted over the transmit antenna. The homodyne oscillator modulates the signal from the PRF generator with a continuous wave (CW) signal, and the AC coupled amplifier operates with a passband centered on that CW signal. The present detector can be used in several applications, including the detection of metallic and non-metallic objects, such as pipes, studs, joists, nails, rebars, conduits and electrical wiring, behind wood wall, ceiling, plywood, particle board, dense hardwood, masonry and cement structure. The detector is portable, light weight, simple to use, inexpensive, and has a low power emission which facilitates the compliance with Part 15 of the FCC rules.

22 Claims, 13 Drawing Sheets

HOMODYNE IMPULSE RADAR HIDDEN OBJECT LOCATOR

STATEMENT OF GOVERNMENT RIGHTS

The United States Government has rights in this invention pursuant to Contract No. W-7405-ENG-48 between the United States Department of Energy and the University of California for the operation of Lawrence Livermore National Laboratory.

CROSS-REFERENCE TO RELATED APPLICATIONS

This application is a continuation-in-part application of the co-pending application entitled Impulse Radar Studfinder, Ser. No. 08/058,398, filed on May 7, 1993, now U.S. Pat. No. 6,457,394, which is incorporated herein by reference. This application also relates to PCT patent application entitled "Electromagnetic Hidden Object Detector", U.S. Pat. Ser. No. 9,404,813, filed on May 9, 1994, by Thomas E. McEwan, which is incorporated herein by reference.

BACKGROUND OF THE INVENTION

The present invention relates generally to detectors for locating hidden objects. More particularly, the present invention relates to detectors for locating objects hidden behind walls, ceilings and floors, for locating metallic and non-metallic buried objects, and further for locating cavities within solid objects.

I. Detection of objects hidden behind wood walls, ceiling and floors

A common problem faced by anyone attempting to hang a picture or cabinet is how to precisely locate between-wall studs, so a sturdy hook may be attached or clearance may be provided for the cabinet. Since wall studs are usually covered by sheetrock or wallboard and finished-off, stud location is not visible. A similar problem arises when hanging plants and lamps from the ceiling, or when nailing down squeaky floorboards and stair steps. General methods for locating studs and joists include tapping with a hammer, searching for nails with a magnetic compass, and random piercing with a nail. Hammer tapping and magnetic compass searching are unreliable and time-consuming, and random piercing is destructive. Once a nail is located, it may be off-center. Also, the stud may be warped, making it impossible to deduce accurate stud location at any distance from the nail.

These conventional methods were vastly improved when electronic wall stud sensors became commercially available. The user places the sensor flat against the wall and scans it laterally across the extent of the wall. When it passes over a stud, a vertical series of LED's indicate the presence of the stud behind the wall. The sensor is based on dielectric density sensing. U.S. Pat. No. 4,099,118 describes a portable electronic wall stud sensor having capacitor plates and circuitry for detecting changes in the capacitive charge due to changes in the dielectric constant in the wall adjacent the sensor. U.S. Pat. No. 4,464,622 describes a similar capacitive sensor with calibration means and means for detecting an AC line in the wall.

Dielectric density sensing has limitations. If a small air gap forms between the sensor and the wall, the device becomes inoperative due to the substantial change in density adjacent the two sensing plates that are internal to the unit. It is therefore difficult or impossible to locate studs on rough or highly textured surfaces. Another limitation is that stud detection is directly affected by the dielectric constant of the intervening wall material. Sheetrock, plywood, particle board, and dense hardwoods vary in dielectric constant to such an extent that a dielectric sensor generally only works on sheetrock and not on plywood walls, wood floors, stair steps, furniture or cabinetry. Furthermore, these conventional sensors cannot detect cavities behind walls or within objects.

Therefore, there is an unsatisfied need for a new detector capable of locating hidden metallic objects such as conduits, electrical wiring and nails, and non-metallic objects, such as pipes, studs and joists behind wood walls, ceilings and floors. This detector should also locate cavities behind the latter structures. It should not be sensitive to the condition of these structures (i.e., accumulated dirt, rough or highly textured surfaces), or to its distance from these structures (i.e., it does not need to be placed flat against these structures). It should not be directly affected by the dielectric constant of the intervening wall, ceiling and floor materials, and should work on almost all structures, including without limitation, sheetrocks, plywood, particle board, dense hardwoods, such as wood floors, stair steps, furniture or cabinetry having different dielectric constants, and tiles.

This new detector should have a first surface cancellation effect, with a fixed and controllable detection or depth adjustment; it should be portable, light weight, easy to use, relatively inexpensive, and should have a low power emission which helps comply with the requirements of Part 15 of the Federal Communications Commission's Rules. Furthermore, this new detector should not interfere with the operation of other detectors and telecommunications and wireless equipment in the vicinity. It should also be adaptable for automating the construction process, such as for use with nail guns.

II. Detection of objects behind masonry and cement structures

Locating hidden metallic and non-metallic objects and cavities behind masonry and cement structures presents further complications. Conventional methods of locating embedded objects rely on trial and error methods, which include drilling several holes in the structures, in the general area where the objects are believed to be hidden. Oftentimes, this method causes damage to the objects and to the drill equipment. Conventional magnetic methods have limited applications, such as detecting copper wiring or aluminum conduit.

Therefore, there is a need for a detector which accurately detects objects and cavities behind masonry and cement structures. This detector should be reliable, portable, inexpensive and simple to use.

III. Detection of Underground Objects

Previously, metallic underground pipes were used almost exclusively in the transportation of natural gas. The location of the buried metallic pipes was relatively simple since metal reflects high frequency electromagnetic waves which can be easily detected. However, underground metal pipes have inherent problems. They are subject to corrosion to differing degrees, they are difficult to install, and they are becoming more difficult and expensive to purchase. As a result of these limitations, other types of pipes have become popular. Polymeric pipes, being virtually non-corrosive, light, easily installed and relatively inexpensive are rapidly replacing metallic pipes.

An ever increasing problem facing the natural gas distribution companies, municipal government agencies, other public utilities and contractors is the rapid and accurate location of buried polymeric pipe lines. Since underground plastic pipes cannot be located with conventional metal detectors, sub-surface detectors of non-metallic and metallic objects have evolved. Examples of these detectors are shown in the following patents:

| Patent/Appliation No. | Patentee | Issue Date |
| --- | --- | --- |
| U.S. Pat. No. 4,062,010 | Young et al. | December 6, 1977 |
| U.S. Pat. No. 4,028,707 | Young et al. | June 7, 1977 |
| U.S. Pat. No. 3,967,282 | Young et al. | June 29, 1976 |
| U.S. Pat. No. 3,806,795 | Morey et al. | April 23, 1974 |
| U.S. Pat. No. 4,905,008 | Kawano et al. | February 27, 1990 |
| U.K. 2,238,201 | Cordes | November 17, 1989 |

Many of these detectors operate by emitting a radar-like signal, reflecting it off of a target, receiving the reflected wave, and operating on it. The target reflects the waves differently than its environment because of its different dielectric constant. The surface of the ground minerals and other items have different dielectric constants and produce signals which may give deceptive information. Water content, in particular, varies the dielectric constant substantially and makes consistent detection of targets difficult at best.

Some of the above listed detectors have tried to compensate for the ground effect in different ways. One representative patent is Young et al., U.S. Pat. No. 4,062,010, which describes an underground pipe detector which addresses the problem of compensation for variations in the dielectric constant without resorting to a dual antenna system, and teaches the use of a single antenna having transmitting and receiving sections. An electrical impulse source transmits a radar-like signal through an antenna into the ground and is reflected by a target. The reflected signal or echo is detected by the antenna and an analog-to-digital converter converts it to a digital form which may be operated on, stored and recalled.

Compensation for different dielectric constants is accomplished by sampling the dielectric constant near the target area and comparing the resultant signal with that received from the target area. The compensation is handled electronically by storing a first signal in order that it can be recalled for comparison with a second signal received from the target. The patented detector seems limited to the processing of converted digital signals, since admittedly, the equipment necessary to operate on an analog signal in a similar manner would be of such magnitude as to be unusable in the field. An inherent problem in this system is that it is relatively large and expensive. It requires a trained operator to interpret the collected data.

U.S. Pat. No. 3,806,795 to Morey et al. relates to a geophysical survey system for determining the character of the subterrain by analysis of reflections from electromagnetic pulses radiated into the ground. The system repetitively radiates into the ground a short duration electromagnetic pulse having a rise time in the order of 1 nanosecond. The antenna which radiates the pulse into the ground is employed to receive the reflections of the pulse. The received signals are coupled through a transmit-receive network to a receiver which permits the input signal waveform to be reconstructed from a sequence of samples taken by the receiver. The system is capable of generating a profile chart indicating the magnitudes of the reflected signals and the depths at which the reflections occurred. However, this system is bulky and expensive.

U.S. Pat. No. 4,905,008 to Kawano et al. relates to a radar type underground searching apparatus for detecting the presence and location of buried objects such as underground gas pipes. This apparatus includes a pulse generating unit which periodically generates a pulse, and a transmitting antenna through which the pulse is sent into the ground. Pulses reflected from an object in the ground and reaching the ground surface are detected by a receiving antenna, and a reflected wave corresponding to each pulse wave received by the receiving antenna is amplified by a radio-frequency amplifier. The output of the radio frequency amplifier is sampled with a sampler such that each sample is delayed by a fixed period from the transmitting timing of each pulse wave. The presence of objects will be detected by the presence of peaks in the low-frequency signal caused by the reflection from the objects and the depths of the objects will be determined by the time at which the peaks appear on a screen. However, this system is also relatively large in size, expensive and complicated to use.

U.K. patent application No. 2,238,201 discloses a ground probing radar for locating objects buried in the ground such as pipes and cables. The radar uses a radio transmission which varies the frequency of a controlled oscillator by feeding it with random or pseudo-random voltages or currents. The oscillator drives an impulse generator. The transmission is received by a sampling gate triggered by a voltage controlled delay receiving the output from a monostable. The voltage controlled delay is set by a ramp voltage produced by a digital to analog converter driven by a counter receiving the output from the monostable. However, the disclosed radar is not too economical.

In yet another attempt to circumvent the problem of non-conductivity of plastic pipes, tracer wires are buried above these pipes. The tracer wires carry an electrical current, and can be located by metal detecting systems. However, tracer wires are expensive, and are eventually destroyed, broken or corroded and, when repairs are made to the pipe, broken wires are often not replaced or repaired. In many instances, tracer wires are never installed.

There is therefore a great and still unsatisfied need for a new locator for detecting objects buried underground, which is portable, easy to use, relatively inexpensive, and which has a low power emission that helps comply with the requirements of Part 15 of the Federal Communications Commission's Rules. Furthermore, this new detector should be readily usable in security applications such as for locating guns and similar objects in suitcases.

SUMMARY OF THE INVENTION

Accordingly, it is an object of the present invention to provide an improved stud finder or other hidden object locator.

It is another object of the present invention to provide a stud finder or other hidden object locator that is not based on capacitive measurements of change in dielectric constant.

It is yet another object of the present invention to provide a new detector capable of locating hidden metallic objects such as conduits, electrical wiring and nails, and non-metallic objects, such as pipes, studs and joists behind wood walls, ceilings and floors, regardless of the condition of these structures or their distance to the detector.

It is still another object of the present invention to provide a new detector for locating cavities behind wood walls, ceilings and floors, regardless of the condition of these structures or their distance to the detector.

It is a further object of the present invention to provide a new detector which is not directly affected by the dielectric constant of the intervening wall, ceiling and floor materials, and which works on almost all structures, including sheetrocks, plywood, particle board, dense hardwoods, such as wood floors, stair steps, furniture or cabinetry having different dielectric constants, and tiles.

It is another object of the present invention to provide a new detector which has a first surface cancellation effect, with a fixed and controllable detection or depth adjustment.

It is still another object of the present invention to provide a new detector which does not interfere with the operation of telecommunications and wireless equipment and other detectors in the proximity.

It is a further object of the present invention to provide a new detector which is adaptable for automating the construction process, such as for use with nail guns.

It is an additional object of the present invention to provide a new detector which accurately detects objects and cavities behind masonry and cement structures.

It is another object of the present invention to provide a new detector for locating underground objects, which is portable, easy to use, relatively inexpensive, and which has a low power emission that helps comply with the requirements of Part 15 of the Federal Communications Commission's Rules.

It is also an object of the present invention to provide a new detector which is readily usable in security applications such as for locating guns and similar objects in suitcases.

Briefly, the above and further objects and advantages of the present invention are realized by a new electromagnetic detector designed to locate an object hidden behind a separator or a cavity within a solid object. The detector includes a PRF generator for generating 2 MHz pulses, and a homodyne oscillator for generating a 2 kHz square wave and for modulating the pulses from the PRF generator. A transmit antenna transmits the modulated pulses through the separator, and a receive antenna receives the signals reflected off the object.

The receiver path of the detector includes a sample and hold (S/H) circuit, an AC coupled amplifier which filters out DC bias level shifts in the S/H circuit, and a rectifier circuit connected to the homodyne oscillator and to the AC coupled amplifier, for synchronously rectifying the modulated pulses transmitted over the transmit antenna. The homodyne oscillator modulates the signal from the PRF generator with a continuous wave (CW) signal, arid the AC coupled amplifier operates with a passband centered on that CW signal.

BRIEF DESCRIPTION OF THE DRAWINGS

FIG. 4A shows a preferred pulse shape with a unipolar peak and exponential tail, FIG. 4B shows a post shoot or ringing pulse, FIGS. 4C and 4D show the resulting indicator signals;

DETAILED DESCRIPTION OF THE PREFERRED EMBODIMENTS

The general operation of the inventive electromagnetic hidden object detector is based on emitting a pulse from a transmit antenna, waiting for a brief period of time corresponding to about 2 inches of round trip time of flight at the speed of light, and then opening a gate connected to a receive antenna to allow the reflected pulse to be sampled. This process is repeated at a 1 MHz rate, allowing approximately 10,000 receive pulses to be averaged prior to driving a signal amplitude display.

The high level of averaging reduces the random noise accompanying the sampled signal to such an extent that extremely low amplitude signals can be detected. Repetitive operation also leads to extreme simplification of the entire circuit.

The invention utilizes an ultra-wideband receiver described in copending U.S. patent application Ser. No. 08/044,745 filed Apr. 12, 1993, now U.S. Pat. No. 5,345,471, by Thomas E. McEwan entitled "Ultra-Wideband Receiver," which is herein incorporated by reference.

Figure 1:
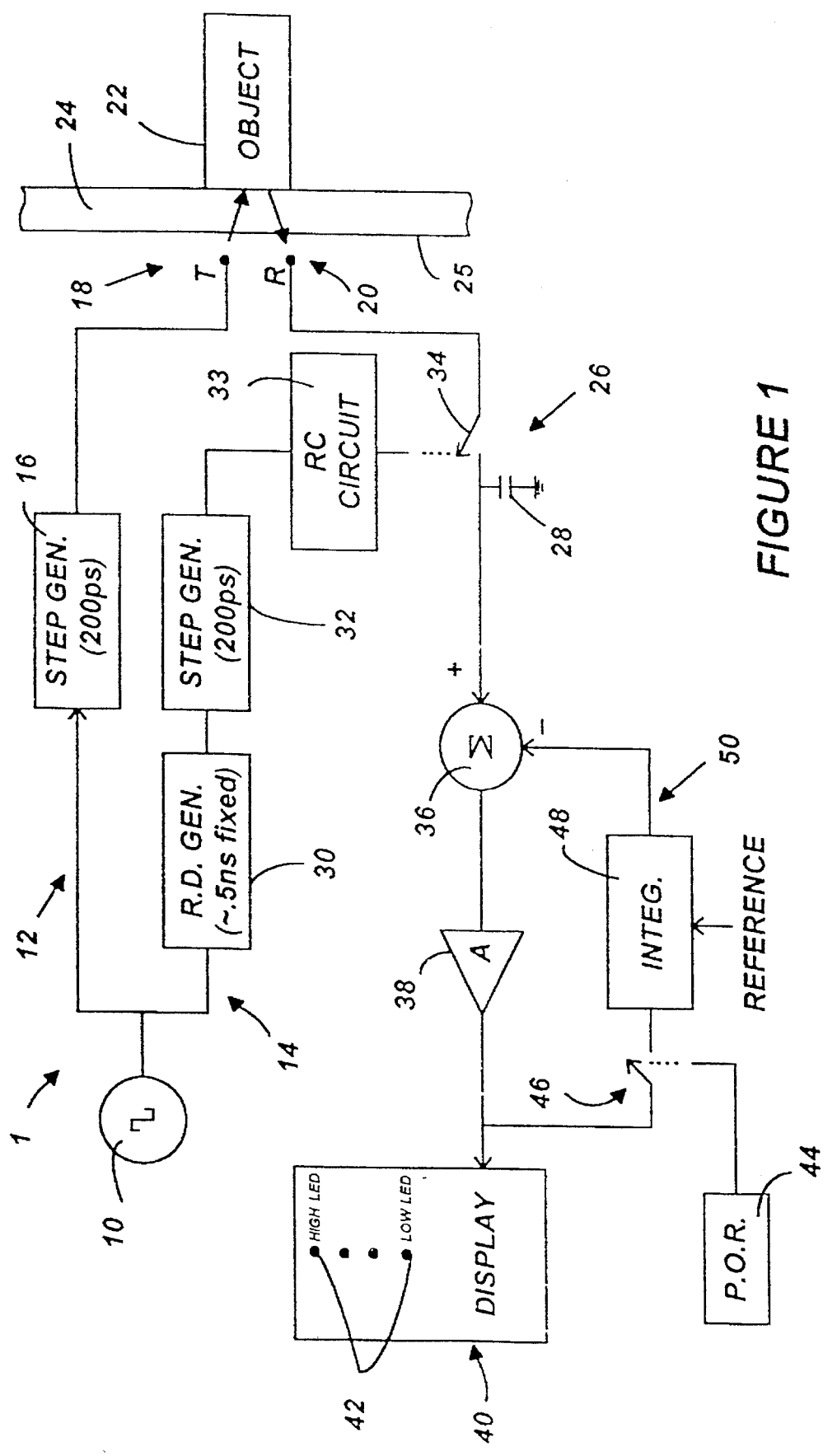
FIG. 1 is a block diagram of a new electromagnetic hidden object detector according to the present invention.

FIG. 1 illustrates a block diagram of the electromagnetic hidden object detector 1. Pulses from a 1 MHz pulse repetition frequency (PRF) or pulse repetitive interval (PRI) generator 10 are input into two parallel paths, a transmit path 12 and a gating path 14. In the transmit path 12, the PRF generator 10 drives a step generator 16, which provides a transmit pulse with a +5 V to 0 V, 200 ps transition that is applied to a transmit antenna (T) 18. The electrical length of the antenna 18 is set to be short relative to the spectral content of the voltage step, so differentiation occurs in the antenna 18, and a 200 ps wide pulse is radiated. The radiated pulse can be considered to be about one half the cycle of an RF sinewave.

A receive antenna (R) 20 picks up the pulse reflected from a hidden object, i.e., a stud 22 behind a wall board 24, and applies it to a sample/hold (S/H) circuit 26 that is gated by a gating pulse from the gating path 14. The gating pulse is delayed by approximately 0.5 ns from the time that the transmit antenna 18 radiates the pulse. Pulses from the PRF/PRI generator 10 which are input into the transmit path 12 are simultaneously input into the gating path 14 where they pass through a range delay generator 30 followed by a step generator 32, which produces a 200 ps gating pulse for controlling a gating switch 34. The delay generator 30 is set at about 0.5 ns so that the range of the electromagnetic hidden object detector 1 is about 1–2". The gating pulse closes the switch 34 so that reflected pulses from the 1–2" range are input into the sample/hold circuit (S/H) 26. An RC circuit 33 may be included between the step generator 32 and the switch 34 to form a shorter gate pulse from the much wider pulse from the step generator 32, i.e., to form a pulse differentiator.

The S/H circuit 26 is formed of a capacitor 28 connected to ground. Reflections, or lack thereof, occurring 1–2" from the antennas 18, 20 are thereby sampled. The size of the capacitor 28 in the sample/hold 26 circuit is sufficiently large that each sample only partially charges it, and approximately 10,000 samples are required for the circuit to reach an equilibrium with the receive antenna signal. The product of the impedance of the receive antenna 20 and the capacitance of capacitor 28 yield a time constant which is much greater than the width of the gate pulse, so it takes many pulses to charge capacitor 28.

Figure 2:
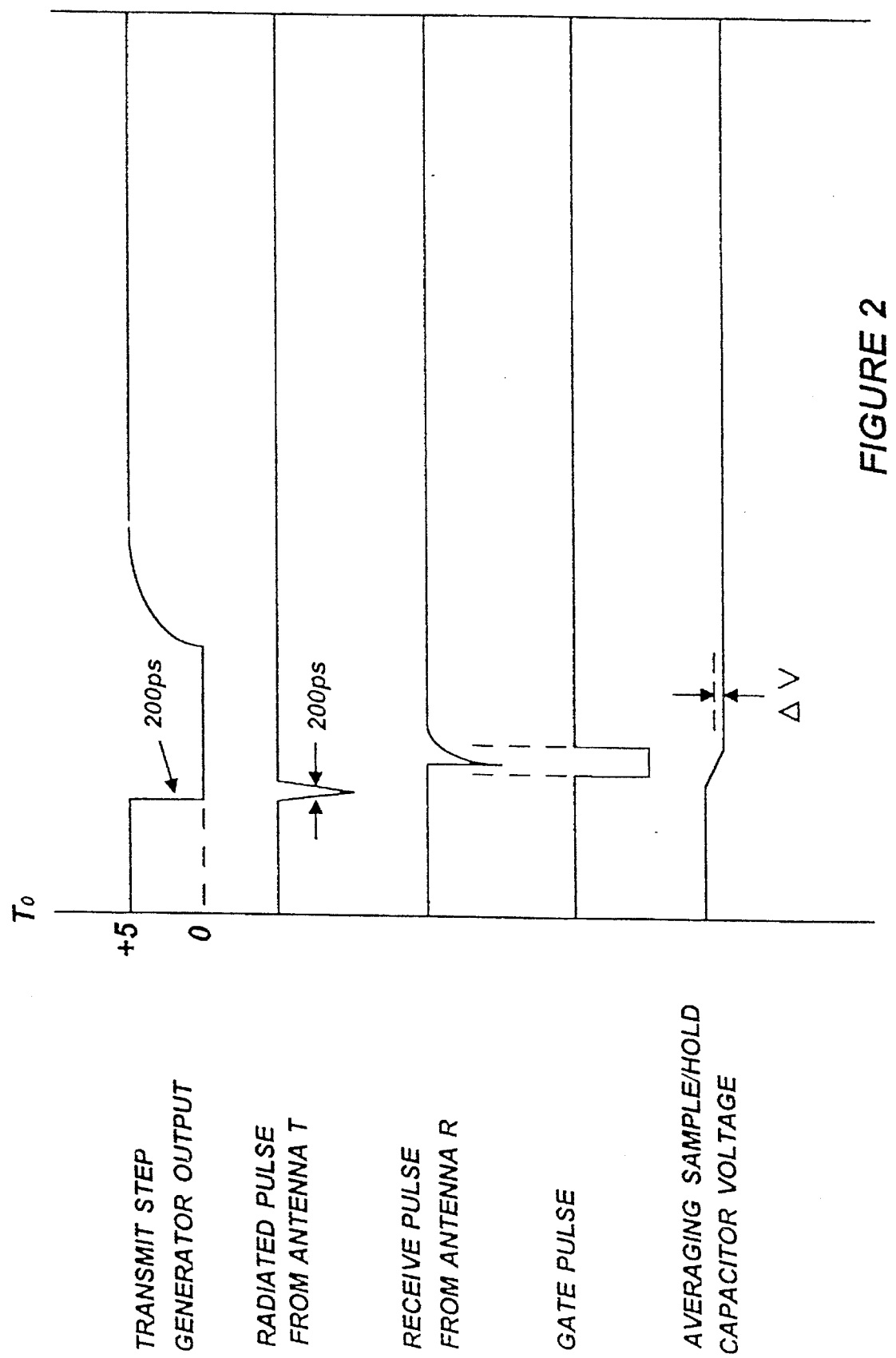
FIG. 2 is a liming diagram of the detector of FIG. 1.

The timing relationship is shown in FIG. 2. The five waveforms are shown over a one pulse repetition interval (PRI). The transmit step generator 16 produces a +5 V to 0 V, 200 ps step, which produces a 200 ps wide radiated pulse from the transmit antenna 18. The reflected pulse from the receive antenna 20 coincides with the gating pulse. Each received pulse produces an incremental voltage change $\Delta V$ on the capacitor 28 of the S/H circuit 26. The capacitor voltage is the output of the averaging S/H circuit 26. The increment $\Delta V = 1/N$ of the total received pulse, where N is the number of samples averaged, typically about 10,000.

The noise voltage at the sample/hold circuit 26 is reduced by a factor related to the square root of the number of samples averaged, 100 times in this case, and by a factor related to the effective time constant of the averaging circuit relative to the PRF of the system and the instantaneous bandwidth of the sampler—a factor stemming from the sampled data nature of the sample/hold circuit. In all, greater than 60 dB noise reduction is obtained compared to a circuit with the full bandwidth of the radiated pulse.

The sample/hold output is applied to a voltage summation element or summer 36, which subtracts background reflections as described herein. The output of the summer 36 is amplified by an amplifier (A)38, typically 60 dB gain and having a passband of DC-16 Hz, and applied to a display 40. The display 40 includes an arrangement of light emitting diodes (LED's) 42 that sequentially light in proportion to the applied voltage, which is linearly related to the reflection magnitude of the electromagnetic pulse.

The display 40 begins to respond at a level corresponding to approximately 100 microvolts appearing at the receive antenna 20. Since systematic errors in the sample/hold circuit 26, the summer 36, and the amplifier 38 may amount to several tens of millivolts, this error must be subtracted out in order to detect small changes, such as a 100 microvolt change caused by a distant hidden object 22. In addition, front surface reflections from the wall 24 contribute to the error voltage.

Therefore, when power is applied to the detector 1, a power-on-reset circuit 44 closes a "calibrate" switch 46 for one second so an integrator 48 in the feedback path 50 of the amplifier 38 servo's the output of the amplifier 38 until an equilibrium is reached, such that the output of the amplifier 38 is forced to equal the reference voltage applied to the integrator 48. Since integrators have extremely high DC gain, the voltage difference between the output of the amplifier 38 and the reference is reduced to a negligible value. The display 40 is also referenced to the same reference voltage as the integrator 48, so the indicator scales its response relative to the voltage deviation from the reference voltage. This power-on calibrate sequence leaves the detector 1 ready to respond to changes in voltages caused only by a change in the pulses reflected off the wall 24 or the object 22.

Figure 3:
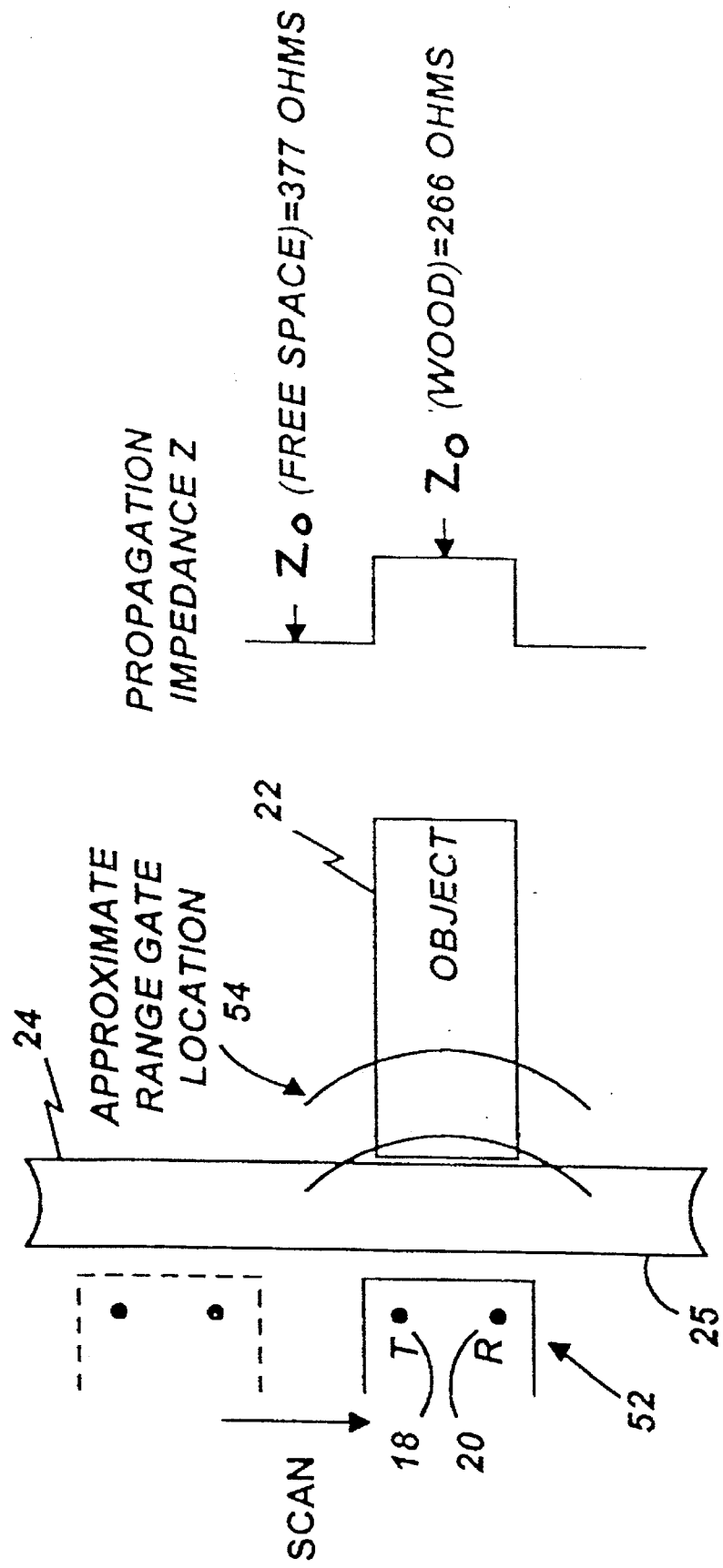
FIG. 3 is a schematic representation of a range gate location and reflection mechanism forming part of the operation of the detector of FIG. 2.

FIG. 3 depicts the geometry of the antennas 18, 20 and the effective physical location of the range gate 54 as is projected into space. Its position is affected by the square root of the relative dielectric constant of the intervening building material (i.e., $\epsilon_r$ about 2–3). As shown schematically in a top view, the transmit antenna (T) 18 and the receive antenna (R) 20 are contained in a housing 52, and are positioned adjacent to the wall 24, and operate with a range gate 54 determined by the delay generator 30 (FIG. 1). The range gate 54 typically extends about 1 inch behind the wall. The range gate 54 is actually curved because it corresponds to a fixed radius set by the echo acceptance time of the S/H circuit 26.

The propagation impedance in free space is defined by the following equation:

$$Z_0(\text{space}) = \sqrt{\mu_0/\epsilon_0},$$

where $\mu_o = 0$ is the permeability of vacuum and $\epsilon_o$ is the permittivity of vacuum. The propagation impedance in a material (such as wood) having $\epsilon_r = 2$ is defined by the following equation:

$$Z_0(\text{wood}) = \sqrt{\mu_0/\epsilon_r\epsilon_0} = Z_0(\text{space})/\sqrt{2}.$$

The free space propagation impedance is 377 ohms and the propagation impedance of wood ($\epsilon_r = 2$) is 266 ohms. This difference in impedance causes a difference in the reflection magnitude when an object such as a stud is present. A profile of the propagation impedance $Z_o$ in the range gate location 54 is shown in FIG. 3.

In a one dimensional analogy to propagation along a transmission line, which can be equated to time domain reflectometry (TDR), reflections off a stud become equivalent to reflections from a transmission line discontinuity. The reflection coefficient $\Gamma$, is defined as: $(Y-1)/(Y+1)$, where $Y = Z(\text{wall})tZ(\text{space})$, and can be applied to determine what fraction of the radiated pulse is returned. For example, if the wall material is wood with an $\epsilon_r = 2$, the reflection magnitude is 0.17. Thus, the difference in reflection magnitude between the presence and absence of a stud is 0.17. If the object 22 were metal, the reflection would be total, or 1.0. Thus, metal is easily discerned from wood by a 5.9 times greater reflection magnitude. Even if the metal has a much smaller cross-section, as may be the case with a wire, it is still easily discerned in practice as long as the polarization of the wire and the detector antenna match—which is generally the case for wires behind walls and for a vertical orientation of the detector 1.

Figure 4A:
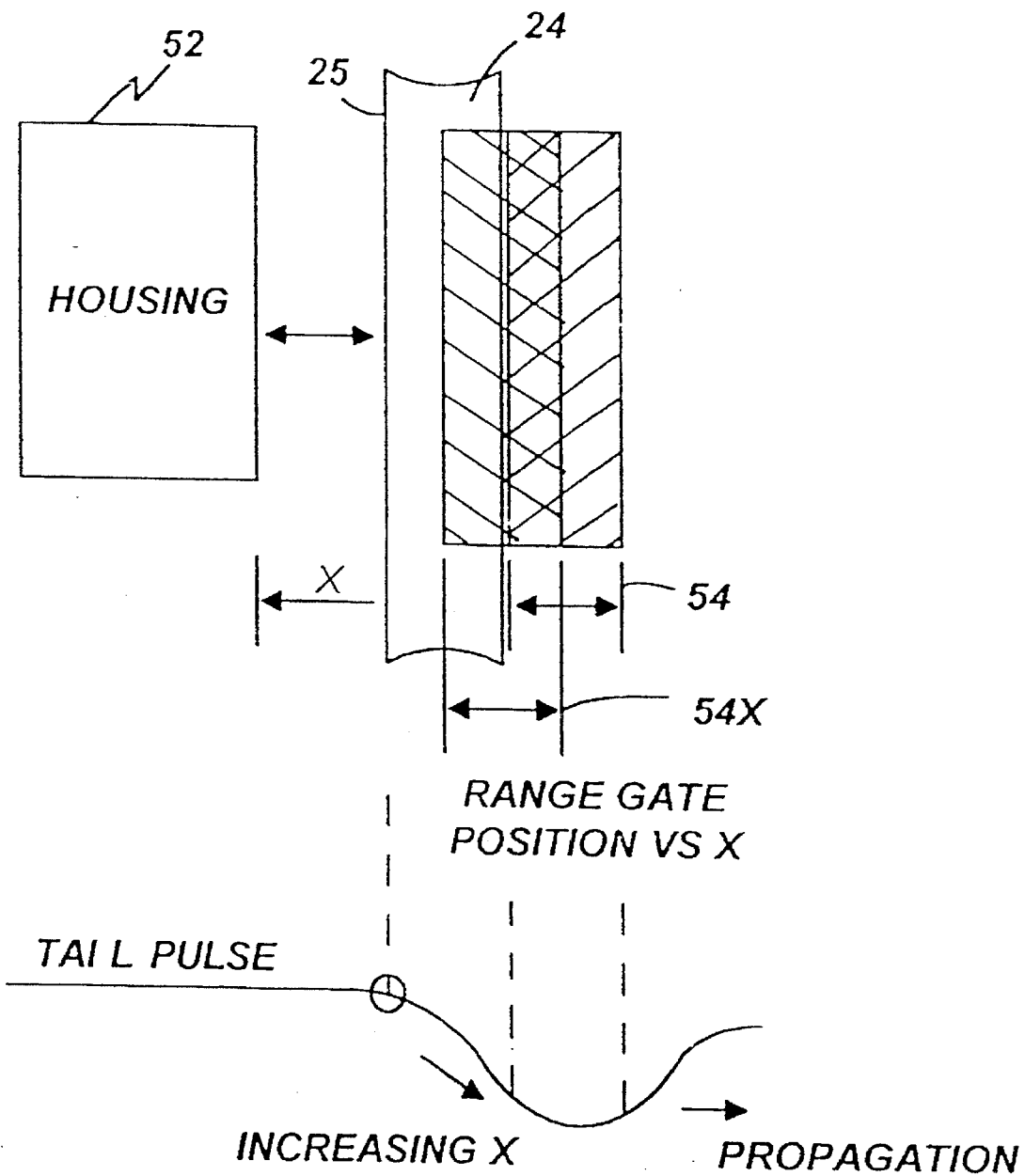
FIGS. 4A–D illustrate various pulse shapes for off-surface invariance, where

The present invention overcomes a serious limitation stemming from a variable reflection magnitude from the first surface 25 of the wallboard 24. In conventional studfinders, the circuit loses its power-on calibration if the studfinder is moved from the wall by even the slightest distance "x" (FIG. 4A). Once out of calibration, the reliable detection of the stud is compromised. It is therefore most desirable that the indicated reflection amplitude from the wallboard 24 remain constant over a housing-to-wall distance of several inches.

Figure 4C:
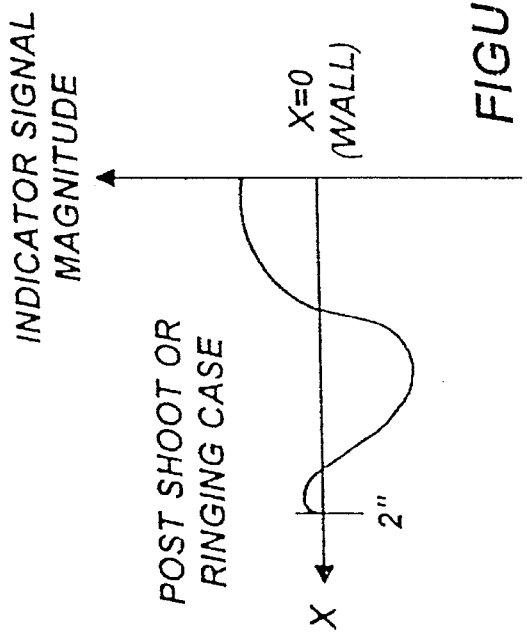
Figure 4D:
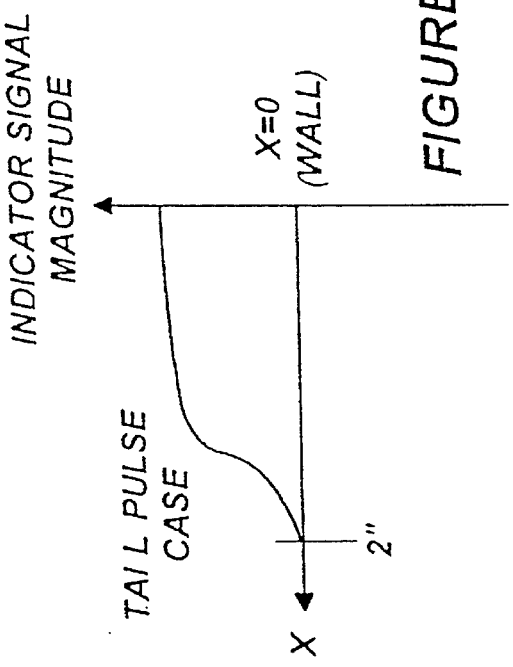
Figure 4B:
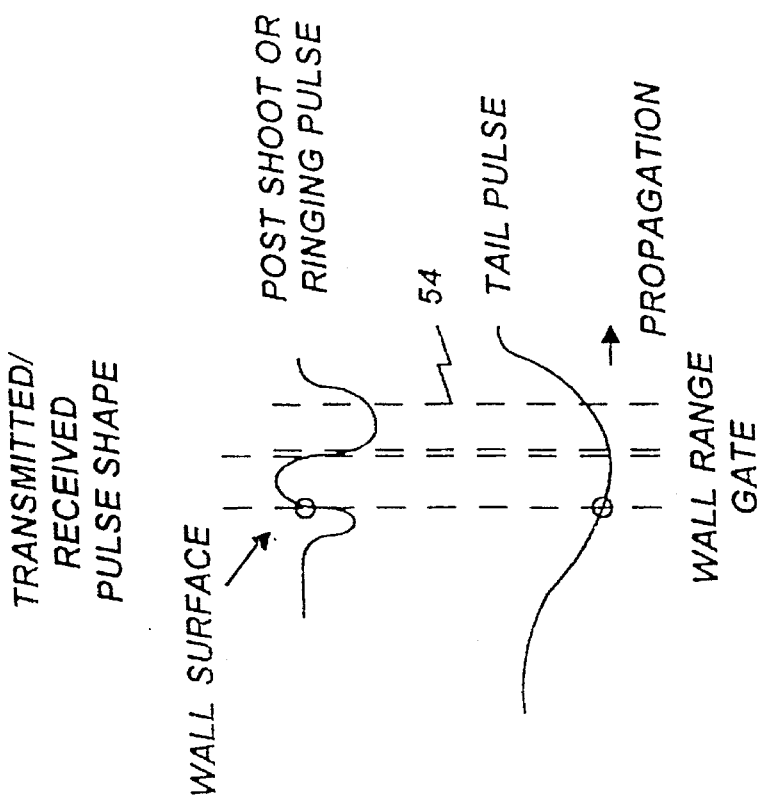

The problem of varying first surface reflection magnitude is caused by radiating a pulse,, shown in FIG. 4B, that contains either post-shoot or ringing—a common effect when radiating pulses through an antenna. What radiates later in time falls into the sampler's gate when reflected off objects closer than the intended range gate 54, i.e. there is a displaced range gate 54 x. Accordingly, ringing components reflect off the front surface of the wall 24 and fold into the reflections from the object 22 in simultaneity. Indeed, these front surface reflections can exceed the rear surface reflections. During power-on calibration, the front surface reflections are subtracted out, so the detector can properly detect an object—until the detector is lifted slightly off the surface and the calibration is altered by changes in front surface reflections. Thus, the detector has little tolerance for rough surfaces or non-contact operation. Because of the changing polarity of the pulse, the indicator signal can change polarity, as shown in FIG. 4C.

The solution for this problem is illustrated in FIGS. 4A, 4B, 4D by the radiated waveform, which has an exponential tail of the same voltage polarity as its peak voltage. If the peak of the pulse is spatially located behind the wall for stud detection, the center of the tail may then be spatially located at the front surface of the wall. When the calibrated studfinder is lifted from the wall (increase "x"), the diminishing surface return, caused by increasing the distance, is compensated by the increasing tail amplitude that becomes positioned at the wall front surface. FIG. 4D snows the indicator signal (amplified reflection signal) for the tail-pulse case,, showing a constant signal over a 2 inch variation in "x". Thus, in the preferred embodiment, the detector 1 emits a pulse having the waveform shown in FIG. 4A. This can be accomplished by the proper design of the transmit antenna 18.

Figure 5:
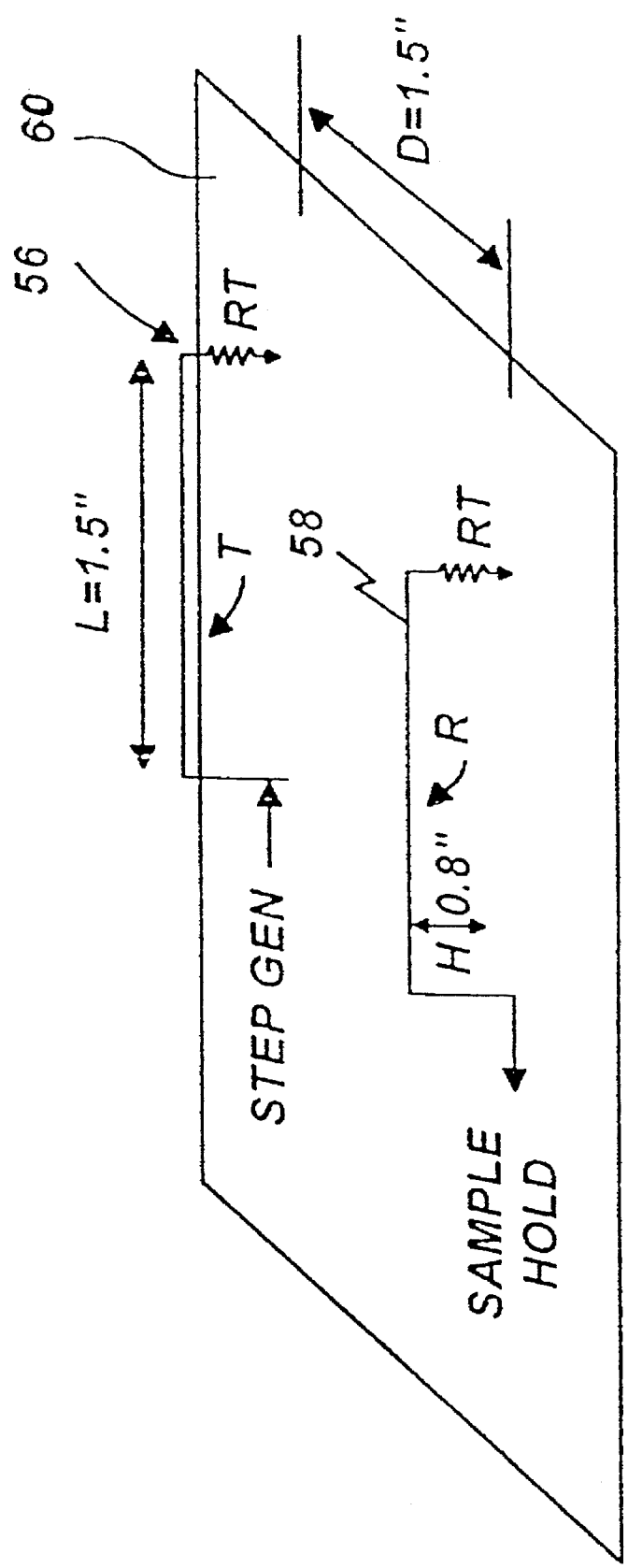
FIG. 5 is a schematic representation of a wire antenna forming part of the detector of FIG. 1.

FIG. 5 is a schematic view of the preferred configuration of the antennas 18, 20. The antennas 18, 20 are formed of wires 56, 58 situated above a ground plane 60 and may be considered to be either leaky transmission lines or bent monopoles. The value of the distal termination resistors $R_T$ affects the shape of the tail pulse, so $R_T$ can be fine-tuned to obtain a flat response characteristic versus distance from the wall surface.

In an illustrative embodiment, the ground plane is a copper ground plane circuit board. The antennas are #24 AWG enameled copper wire. Each antenna has a length L of about 1.5" and a height H of about 0.8".

The transmit antenna 18 is driven by a voltage step so its radiated waveform tends to be a pulse with a slight tail caused by the distal reflection from $R_T$, which is set to be higher than the propagation impedance of the 1.5 inch wire. A similar effect occurs at the receive antenna 20, where there is no termination at the sample/hold input. The combination of high impedance and parasitic capacitance at the sample/hold input tend to integrate the receive pulse, further stretching the tail of the pulse. The propagation impedance of the 1.5 inch wire is about 200 ohms, and the value of $R_T$ is about 330 ohms.

Figure 6:
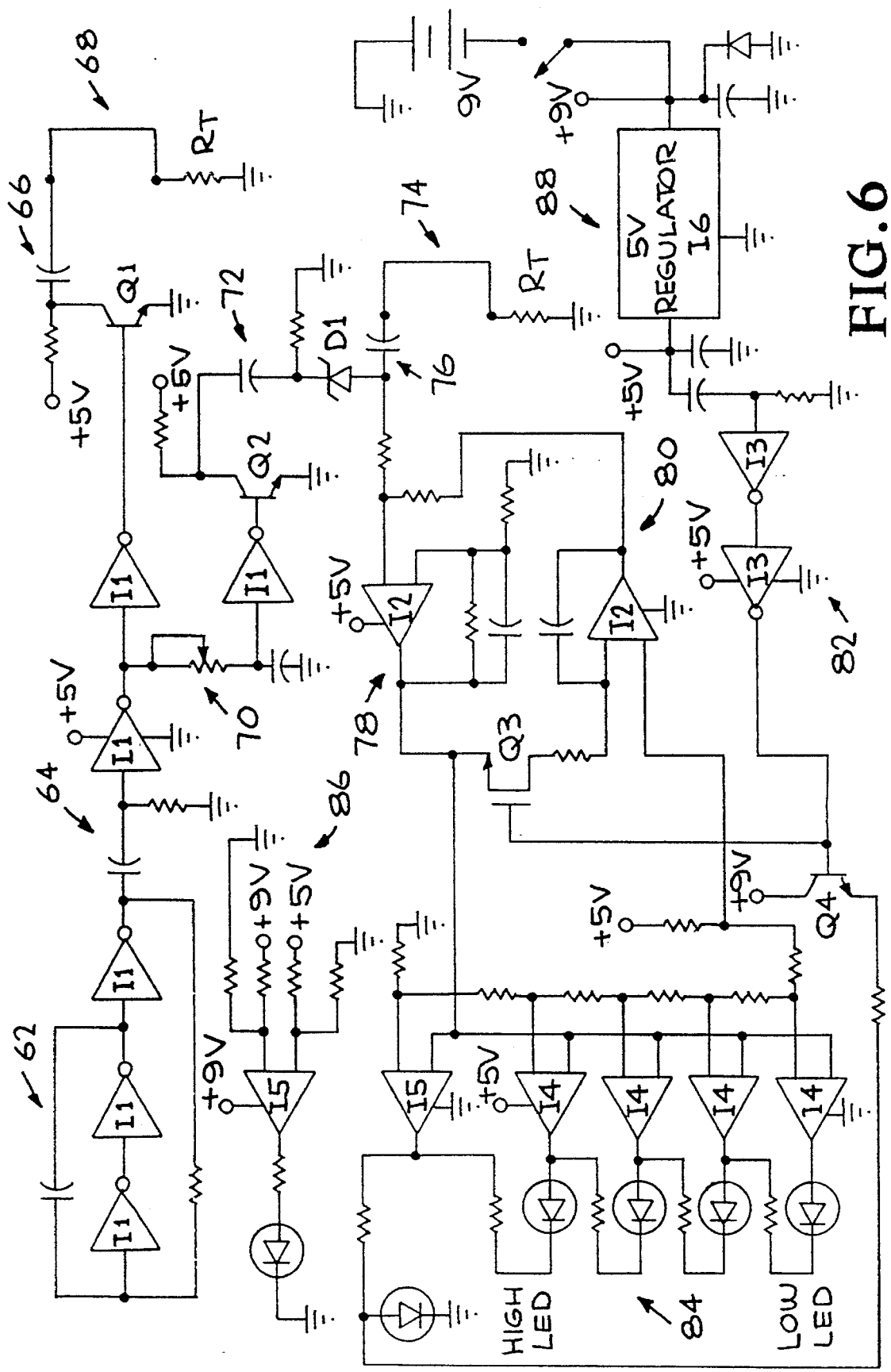
FIG. 6 is a schematic circuit diagram of the detector of FIG. 1.

FIG. 6 shows a prototype embodiment of the detector 1. The PRF generator 62 is formed of three inverters (I1) and is followed by a pulse width limiter 64. The pulses pass to step generator 66 formed of a low cost TV tuner transistor Q1=BFW92, whose output is connected to the transmit antenna 68 which is a wire loop. The pulses from the PRF generator 62 also follow a second path through the range delay generator 70 which is formed of a variable resistance plus stray capacitance and input capacitance of a buffer gate. The delayed pulse is input into step generator 72, formed of another transistor Q2=BFW92, which produces the gating pulse.

The reflected signals are picked up by the receive antenna 74 and input into S/H circuit, (capacitor) 76 which is gated by the gating pulse through a Schottky diode D1=MBD701. The output from the S/H circuit 76 is input into amplifier (I2) 78. A second amplifier (I2) 80 is connected though calibrate switch (MOSFET) Q3 (part of I3) from the output of amplifier 78 back to its input to form the baseline subtractor/integrator circuit.

The "power on" reset circuit 82 (I3) turns on transistor Q3 so that the output of amplifier 78 is fed back through operational amplifier 80 to subtract the background from the input of amplifier 78. The input of amplifier 78 serves as the summer for the S/H circuit 76 output and the calibrate signal from amplifier 80. The output of amplifier 78 drives the indicator circuit 84 which is formed of a plurality of comparators (I4) referenced to different levels which drive associated LED's. The highest level LED "metal" is turned on by comparator (I5); the high reflectivity of metal produces a high indicator signal. A low battery test circuit 86 (I5) and voltage regulator circuit 88 (I6) are also included. In a preferred embodiment, I1=74HC04, I2=TLC272, I3=CD4007, I4=LM324, I5=LM358, and I6=78L05.

The detector of this invention propagates an electromagnetic pulse, and since electromagnetic propagation scales by the square root of dielectric constant, the detector is substantially independent of building materials. Further, the; propagating pulse will easily radiate across an air gap of several inches. The sensitivity of this invention is such that a stud can be detected behind several inches of concrete with the unit held an inch off the surface of the concrete (about 40 dB signal-to-noise ratio). The detector 1 can similarly be applied to locate a variety of hidden objects.

Figure 7:
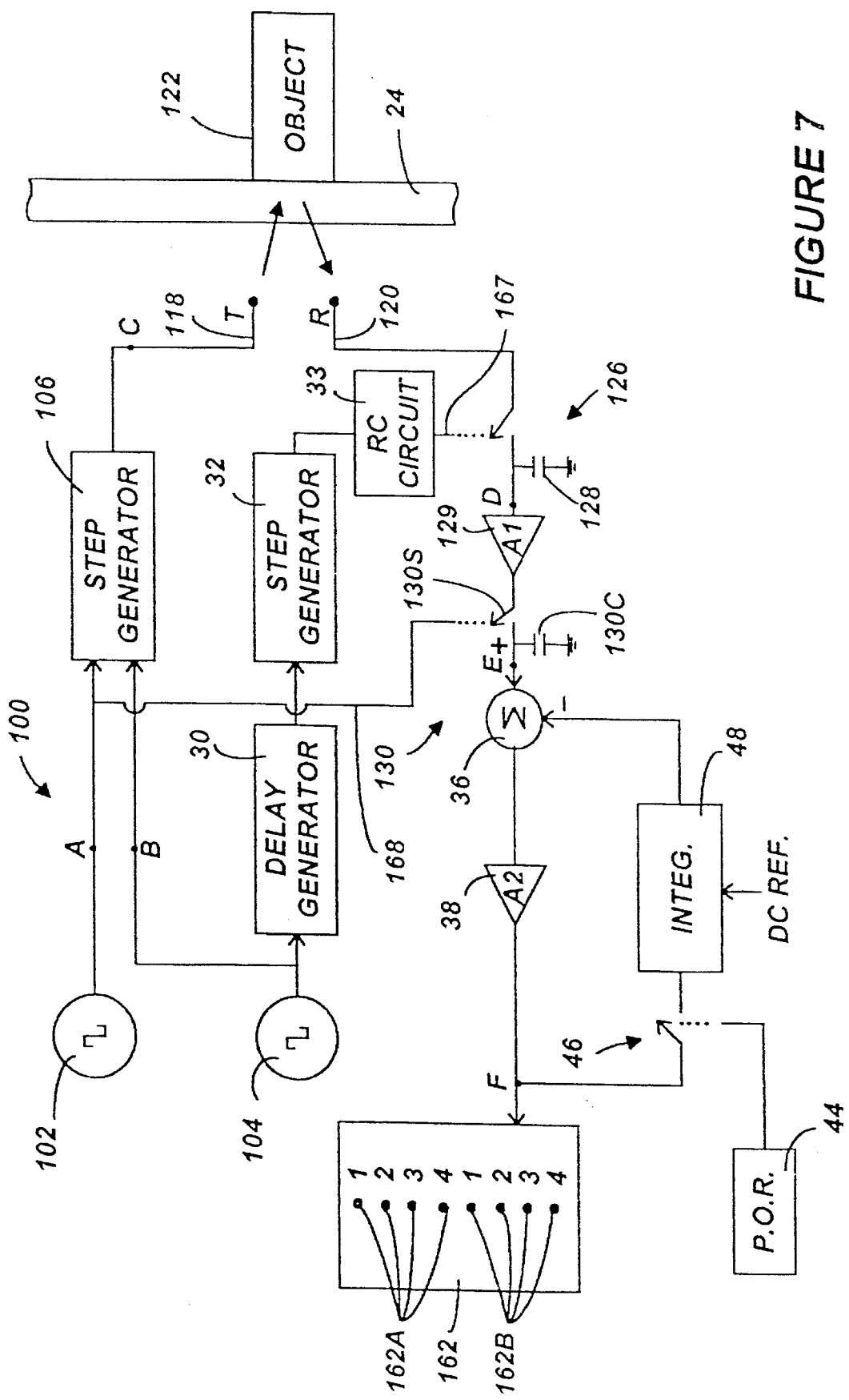
FIG. 7 is a block diagram of another embodiment of a new homodyne electromagnetic hidden object detector according to the present invention.
Figure 8:
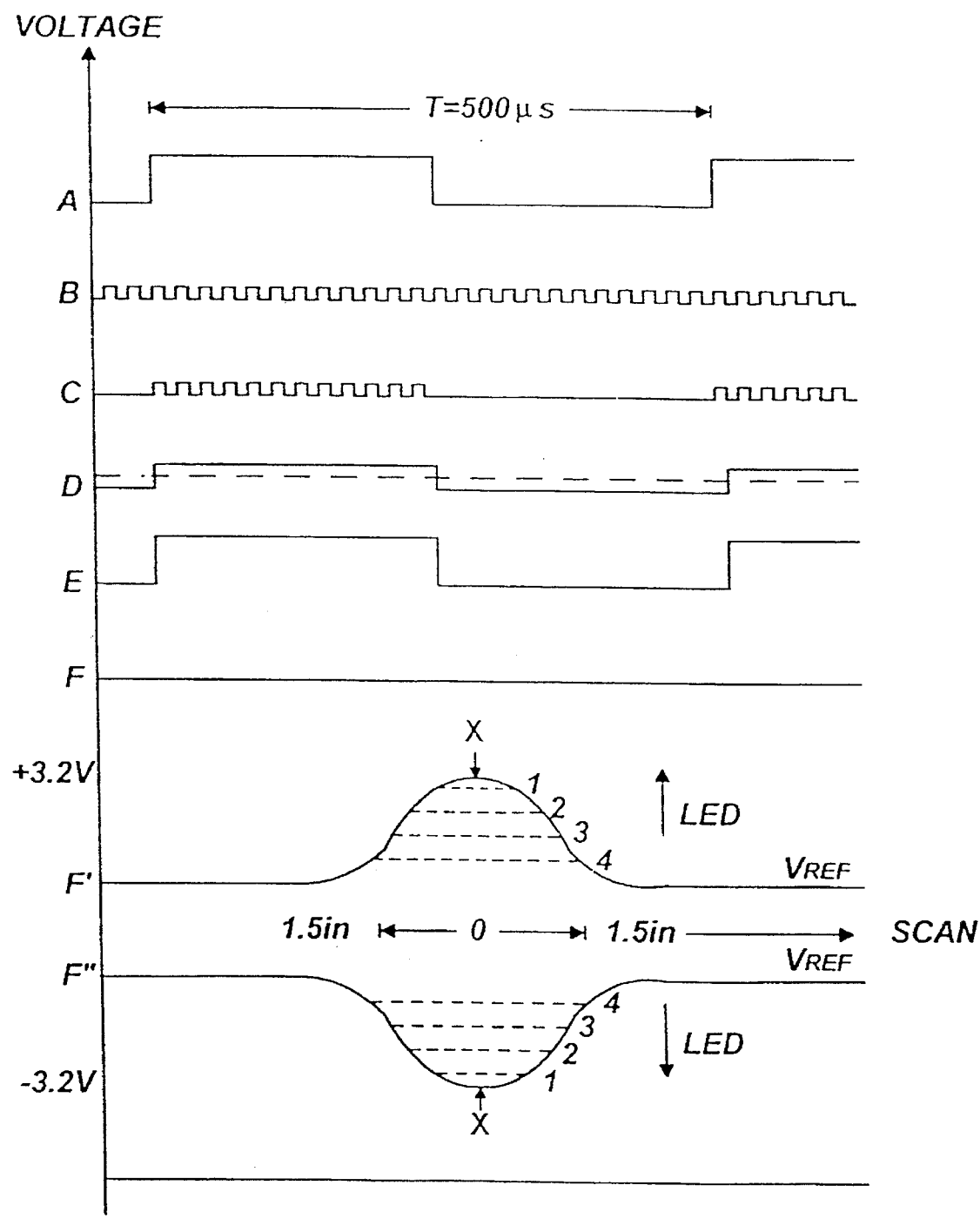
FIG. 8 illustrates various timing charts at different sections of the detector of FIG. 7.
Figure 9A:
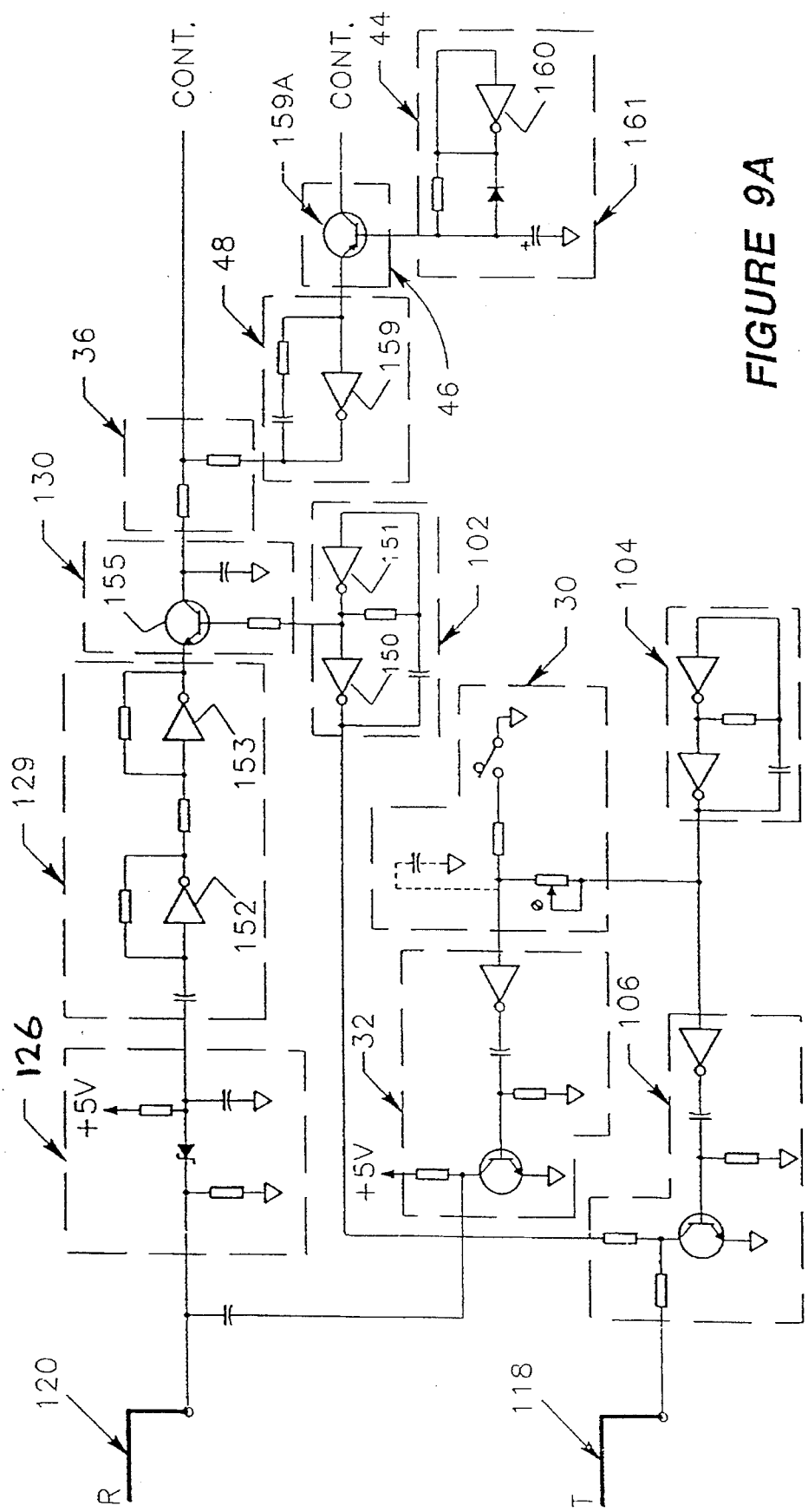
FIGS. 9 A and B represent a circuit diagram of the detector of FIG. 7.
Figure 9B:
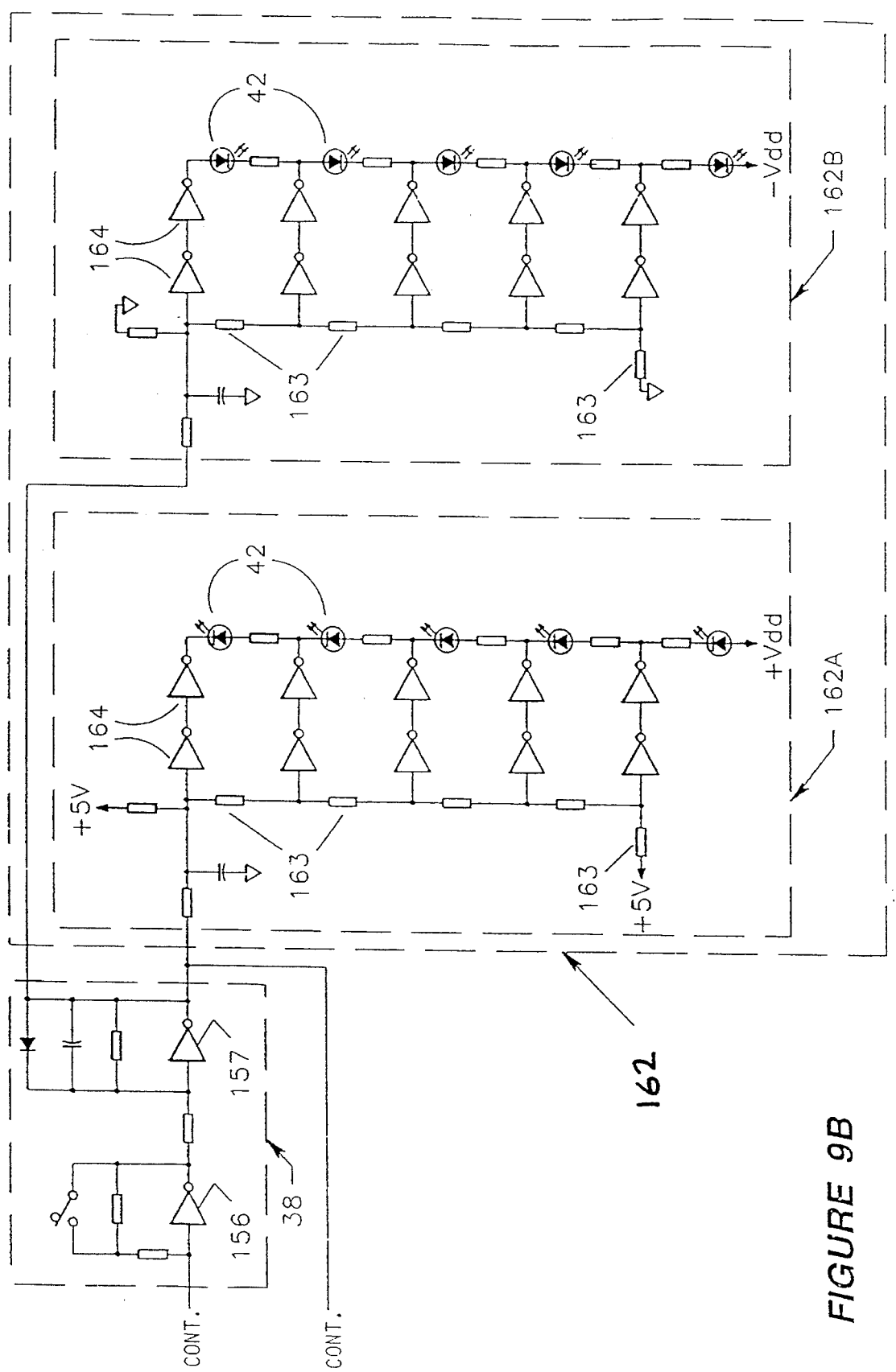

FIGS. 7, 8 and 9A, B illustrate another electromagnetic hidden object detector 100 according to the present invention. The detector 100 operates in a generally similar way to the detector 1 of FIG. 1, and further includes additional features described hereafter. One such feature of the detect:or 100 is to significantly reduce, or to completely eliminate the near wall proximity effect with the receive antenna that causes a DC level shift in the receiver, resulting from the impedance shift of the receiver antenna. This objective is achieved by using an AC coupled amplifier in the receiver path that prevents DC signals from passing from the awe, raging sample and hold circuit to the display. This AC coupled amplifier filters out the DC bias level shifts in the S/H circuit 26 caused by near wall proximity effect to the receive antenna 20.

Another new feature of the detector 100 is the materials thickness control, which allows the detector 100 to locate hidden objects behind either a relatively thin or thick separator, including without limitation, a wall, ceiling, floor, ground, etc. This feature will particularly enable the detector to be used with concrete and stone wall separators. This thickness control feature is also achieved by impressing an AC modulation upon the transmitter pulses, and then synchronously rectifying this AC modulation in the receiver (homodyne technique), thereby permitting the use of an AC coupled amplifier in the receiver, to eliminate near wall proximity errors.

The detector 1 has been modified for homodyne operation. The homodyne technique involves modulating a signal from a PRF generator prior to radiation and detection with a continuous wave (CW) signal. The receive amplifier then operates with a passband centered on the CW signal and is thus AC coupled. After amplification, the signal is synchronously detected using the same CW signal.

In FIG. 7, tile detector 100 includes a homodyne oscillator 102 which typically operates at several kHz (in the present example 2 kHz), and a PRF generator 104 (similar to the PRF generator 10 shown in FIG. 1), which generally operates in the range of 1 MHz to several MHz (i.e., 2 MHz in the particular example described hereafter). It should however be understood that the homodyne oscillator 102 generates a signal whose frequency is faster than the response time of the display 160. It should also become clear that the homodyne signal can alternatively be an arbitrary sequence of pulses having a mean frequency on the order of several kHz and a zero average.

The signals from the homodyne oscillator 102 and the PRF generator 104 are fed into a step generator 106 where the homodyne oscillator 102 amplitude modulates the step signal generated by the step generator 106, in effect turning the step generator ON and OFF at the desired homodyne frequency, which in this example is 2 kHz. Therefore, the signal output by the step generator 106 and transmitted by the transmit antenna 118, includes periodic packets of pulses having a frequency of 2 kHz, such that each pulse typically comprises bursts (such as 1,000 pulses) at a frequency of 2 MHz, with a 0.5 millisecond burst interval.

As the pulses are transmitted over the transmit antenna 118, they are reflected off a hidden object 122 for reception by the receive antenna 120. The signals reflected off the object 122 are formed of a sequence of periodic pulses, corresponding to the transmitted packets, and having a period of 2 kHz. The 2 MHz pulses or bursts within the 2 kHz envelopes are reflected off the hidden object as described above in connection with the detector 1. At the receive antenna 120, the amplitude of the 2 kHz envelope is related to the reflection from the hidden object 122.

For a proper display of the waves reflected off the object 122, it is desired to reference the 2 kHz envelope to a predetermined reference level from the integrator 48, thus allowing the detector 100 to basically operate similarly to the detector 1. For this purpose, a receiver sample and hold circuit 126, similar to the sample and hold circuit of detector 1, averages the 2 MHz bursts (pulses) over a period of about 1 millisecond, so that only the 2 kHz homodyne frequency remains on the sample and hold capacitor 126. The homodyne frequency is amplified by an AC coupled amplifier 129, and is thereafter synchronously rectified into a DC level by means of a synchronous rectifier 130. The advantage of the AC amplifier 129 is that detector DC bias levels, i.e., the DC bias levels at the sample and hold circuit 126 are not allowed to pass through (i.e., filtered out).

These DC bias levels vary with the power supply fluctuations and, more importantly, with materials brought into near proximity to the receive antenna 120. The near proximity effect of the materials changes the characteristic impedance of the receive antenna 120, and thus the average rectified gate pulse signal. The rectified DC level at the output of the synchronous rectifier 130 represents the reflected pulses from the hidden objects, and the subsequent operation of the detector 100 is similar to that of the detector 1.

In operation, the rectifier switch 130S closes during one half of the homodyne oscillator cycle, and charges the capacitor 130C during this half cycle. During the complementary (i.e., remaining) half cycle of the homodyne oscillator cycle the switch 130S is open, and the rectifier 130 does not detect the signals from the homodyne oscillator 102. As a result, the average signal applied to the capacitor 130C represents the peak amplitude of the signal (square wave) at the output of the AC coupled amplifier 129, thereby generating a DC voltage which corresponds to the reflection signal from the hidden object 122 and not from the DC voltage from the sample and hold circuit 126.

The DC voltage developed on the capacitor 130C represents the summation of the desired signals reflected from the hidden object 122, as well as undesirable reflections from various sources including the detector housing and direct antenna-to-antenna coupling. Therefore, at turn on, the detector is held at a distance from the separator and the power-on-reset circuit 44 closes the switch 46, causing a feed back action through the integrator 48, and its associated DC reference voltage. Consequently, the output of the DC coupled amplifier 38 is caused to be equal to the DC reference voltage.

Shortly after turn-on, the switch 46 is opened and the voltage at the output of the integrator is maintained at a steady level which represents the correction for the undesirable reflections (or signals) mentioned above. The summer 36 continues to subtract this correction voltage from the voltage at the output of the capacitor 130C, thereby providing a signal that very closely corresponds to the reflections from the hidden object 122. It should be noted that a similar mode and logic of operation will apply to the detection of cavities.

FIG. 8 illustrates various timing charts at different sections of the detector 100. Chart A corresponds to, and represents the voltage at point A, which is the output of the homodyne oscillator 102, and shows a pulse signal with a period of 500 μs, corresponding to a 2 kHz frequency. Chart B corresponds to the voltage at point B, which is the output of the PRF generator 104, and shows a pulse signals with a period (not to scale ) of 500 nanoseconds, corresponding to a 2 MHz frequency.

Chart C illustrates the voltage at point C, which is the output of the step generator 106. Chart D shows the voltage at point D, which is the output of the sample,, and hold circuit 126, as a pulse or square wave, with an associated DC component. Chart E represents the voltage at point E, which is the output of the AC coupled amplifier 129. Chart F is the reference voltage at point F, which is the output of the DC coupled amplifier 38 during power on reset, and corresponds to the reference voltage Vref.

Charts F' and F" represent the voltages at point F and illustrate the operation of the detector 100, corresponding to the detection of a cavity (Chart F') and a solid object (Chart F"), with the axis x—x representing the center of the object and the cavity. The phantom lines represent the various levels at which the LED's of the display indicators 162A and 162B light up. For example, with reference to Chart F", the fourth LED (4) will light up as soon as the detector 100 is about 1.5 inches away from the center of the object 122. As the detector 100 approaches the center of the object, the third LED (3) will light up, and then the second LED (2), and finally the first LED (1) will light up indicating the position of the center of the object 122. Thereafter, as the detector 100 is progressively distanced away front the center of the object 122, the LED's will light up in the reverse order.

FIGS. 9A, B represent a circuit diagram of a prototype embodiment of the detector 100. The transmission path of this circuit is generally similar to the transmission path of the detector 1 shown in FIG. 6, and further includes the homodyne oscillator 102, which typically includes two 74HC04 inverters 150, 151 by National Instrument.

The output of the homodyne oscillator 102 is simultaneously connected to the step generator 106 and the synchronous rectifier 130 along the receive path. The receive path of the circuit of the detector 100 is generally similar to that of the detector 1, and further includes the AC coupled amplifier 129 and the synchronous rectifier 130. The AC coupled amplifier 129 is connected between the averaging sample and hold circuit 126 and the synchronous rectifier 130, which, in turn, is connected to the summer 36. The AC coupled amplifier 129 includes two MC 14069UB inverters 152, 153 by Motorola, used in a linear mode as amplifiers. The synchronous amplifier 130 includes a bipolar transistor 155, such as transistor 2N2222 by National Semiconductor, that is turned ON or OFF by the homodyne oscillator 102.

The DC coupled amplifier 38 includes two MC14069UB inverters 156, 157 by Motorola used in the linear mode as amplifiers. Similarly, the integrator 48 and the power-on-reset circuit 44 include MC 14069UB inverters, such as inverters 159, 160 respectively. The power-on reset circuit 44 further includes an RC circuit 161 which acts as a self referencing buffer. The output of the DC coupled amplifier 38 drives the display 162. It should become clear to those skilled in the art after reviewing the present invention, that while the circuits of the disclosed embodiments have been described in term of discrete components for simplicity and clarity purpose, these circuits can alternatively be miniaturized by integrating these components on an integrated circuit or chip.

The display 162 includes a plurality of LED display assemblies formed of LED's 162A and 162B that sequentially light in proportion to the applied voltage, which is linearly related to the reflection magnitude of the electromagnetic pulse. The display 162 further includes a network of resistors 163 and inverters 164 (such as 74HC04 inverters), whose internal discrimination level defines the threshold at which the LED's 162A and 162B are turned ON. In this particular illustration, the LED's 162A indicate the presence of a hidden object, while the LED's 162B indicate the presence of cavities within a solid object.

For cavity detection, the voltage applied to the display 162 is reversed (i.e., has an opposite polarity) relative to the voltage indicating solid objects. In operation, the detector 100 may be calibrated to a solid portion of the separator 24, and as the detector 100 is moved along the separator 24, the cavities will produce less reflection than the calibration position, thereby driving the display indicators 162B.

Therefore, the detectors are capable of locating hidden metallic objects such as conduits, electrical wiring and nails, and non-metallic objects, such as pipes, studs and joists behind wood walls, ceiling, floors, masonry and cement structures, regardless of the conditions of these structures or their distance to the detector. This feature is accomplished by transmitting short electromagnetic pulses and sampling reflections from the hidden object 122 by range gating (i.e., setting a predetermined detection range or range gate 54 as shown in FIG. 3) the receive sample and hold circuit 126 at a specific location from the separator 24. Additionally, the detector 100 can be moved relative to the separator 24, and it is not necessary to keep it in close proximity to the separator 24.

The new detectors will not be directly affected by the dielectric constant of the intervening wall, ceiling and floor materials, and will work on almost all structures, including sheetrocks, plywood, particle board, dense hardwoods, such as wood floors, stair steps, furniture or cabinetry having different dielectric constants, and tiles. This feature is achieved by using an electromagnetic sensor which is affected only by the square root of the dielectric constant of the matter be scanned. As a result, the detector is much less dependent on the dielectric constant variations than a capacitive sensing studfinder, thus providing more accurate measurements.

The present detectors present a first surface cancellation effect, with a fixed and controllable detection or depth adjustment. The first surface cancellation effect is implemented by controlling the transmitted waveform, and by the proper selection of the characteristics of the pulses from the pulse generators and the dimensions and geometry of the antennas.

Additionally, the new detectors are portable, light weight, simple to use, reliable, relatively inexpensive, and have a low power emission, which helps comply with the requirements of Part 15 of the Federal Communications Commission's (FCC) Rules. Part 15 requires less than 500 microvolts per meter field strength at a 3 meters distance from the transmit antenna. The power emission of the detectors 1,100 has been measured to be 100 microvolts per meter.

The present detectors do not interfere with the operation of telecommunications and wireless equipment and other detectors in the proximity. These detectors accomplish the required low power emission through the use of a receiver that averages a very large number of pulses, and do not relay on the high power avalanche mode pulse generators to form the transmitter.

The present detectors are adaptable for automating the construction process, such as for use construction tools or equipment in order to control their operation, thereby improving the efficiency of the construction process, The present detectors can locate objects buried underground. While the capacitive type detectors do not operate properly on moist soil, the present detectors provide precise readings because the emitted signal propagates with a relatively low loss through both dry and moist soil.

The detectors according to the present invention are readily usable in security applications such as for locating guns, weapons in suitcases or briefcases. These detectors will not only detect metallic objects but will also detect other objects having a high density, such as plastic explosives. In general, clothing emits less reflection than solid objects, and thus is easily distinguishable from these solid objects. When the detectors are used in security applications, it is possible to adjust or program their sensitivity for a more accurate performance.

Figure 10:
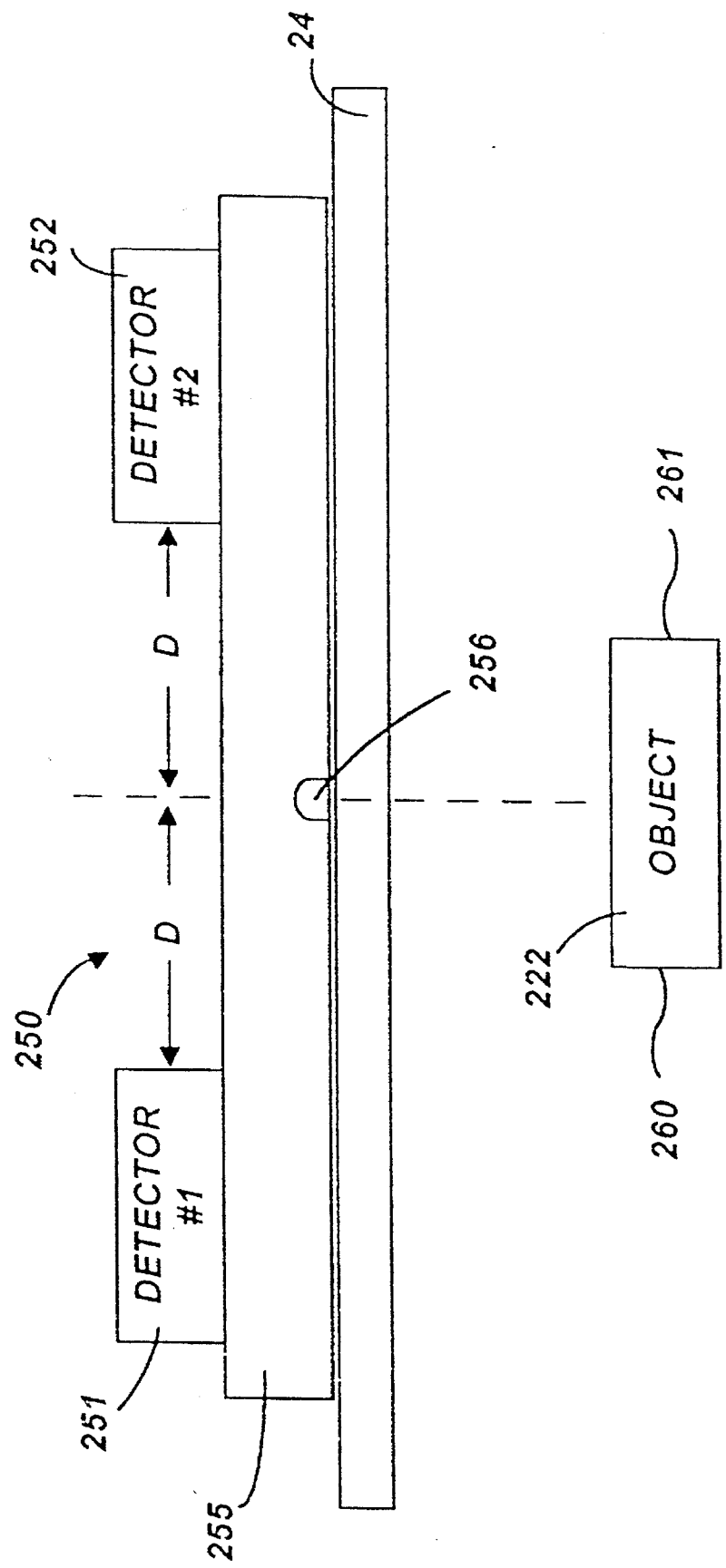
FIG. 10 is a schematic view of an automatic tool arrangement which includes two generally identical detectors of FIGS. 1 or 7.

FIG. 10 illustrates a schematic view of an automatic tool arrangement 250, which includes two generally identical detectors 251 and 252 similar to either of the previous embodiments, i.e., detector 1 or 100. The detectors 251 and 252 are mounted on a desired tool or tool housing 255, such as a nail gun. In operation, as one of the detectors, i.e., 251 approaches the object (i.e., a stud) 222, the display indicator 162A (FIG. 7) will light up to indicate the presence of the object 222, while the detector 252 does not detect the presence of the object 222.

As the detector 252 approaches the object 222, its display indicator(s) will light up. However, as long as the detectors 251 and 252 are not substantially symmetrically positioned relative to the object 222 (such as the center of the object 222 if the latter is not too wide), then the display indicators of the detectors 251 and 252 will not provide the same indication level. For instance, the fourth LED of the detector 251 might light up, while only the second LED of the detector 252 is simultaneously lit. As the detectors 251 and 252 approach the desired position, for instance they become; symmetrically positioned relative to the center of the object 222, then the display indicators 262A of both detectors 251 and 252 will provide the same indication levels. In the foregoing examples, the third LIED of both detector displays will light up simultaneously. As soon as this desired position is reached, one or both detectors 251 and/or 252 generate a control signal to the tool (i.e., nail gun) 255, for activating a nail dispenser 256 that forms part of the tool 255, in order to dispense one or more nails.

The foregoing arrangement can be modified and used in conjunction with various applications without departing from the scope of the intended invention. The following are a few non-comprehensive examples of such applications. In some cases, it would be desired to dispense two parallel columns of nails, not necessarily at the center of the objects 222. Therefore, the detectors 251 and 252 can be regulated, such as by programming, to issue a control instruction to the nail gun 255, to dispense one or more nails, individually or in a delayed sequence, as soon as a desired or predetermined spatial relationship between the detectors 251 and 252 and the object 222 is reached.

Merely for illustration purposes, if the object has a known dimension, such as a width of four inches, and it is desired to dispense a series of nails at a distance of one inch from each edge 260, 261 of the object 222, then the nail gun (or tool) will be instructed (or programmed) to dispense nails as soon as the third LED of the detector 251 is lit simultaneously with the first LED of the other detector 252, until the first column of nails is completed. Similarly, the nail gun 255 will be instructed to dispense nails as soon as the third LED of the detector 252 is lit simultaneously with the first LED of the other detector 251, until the second column of nails is completed.

The nail dispensing sequence can be interrupted either manually, or, if desired, automatically, as soon as the positions of the detectors 251 and 252 change relative to the object 222, either intentionally or by accident. In some applications, when the exact positioning of the nails is not entirely required, it would be desirable to include a predetermined margin of error in the program instructions to the nail gun 255, such that it will continue to dispense nails as long as the LED indicators of both detectors 251 and 252 indicate the relative position of the nail gun 255 is within an acceptable tolerance level.

Figure 11:
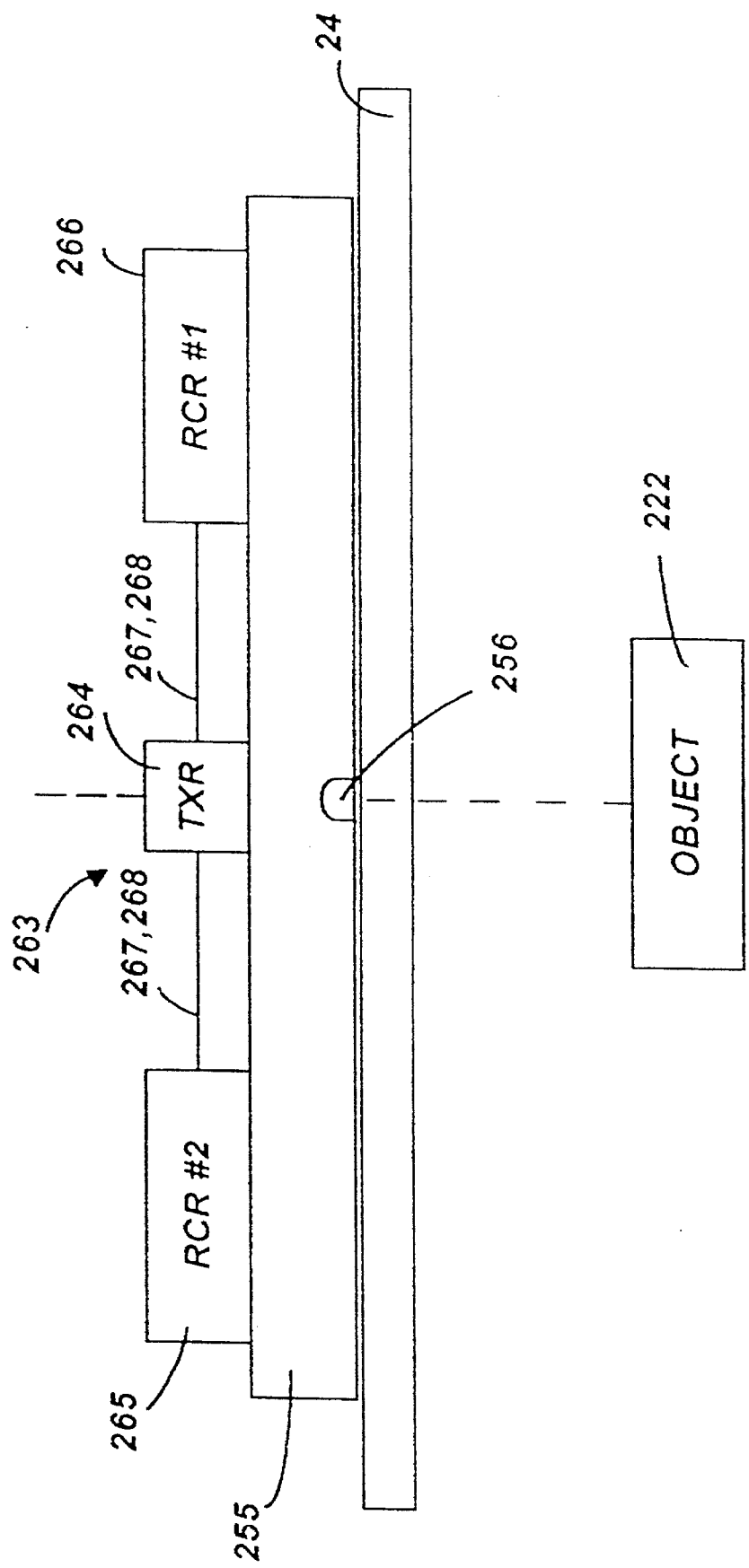
FIG. 11 is a schematic view of another automatic tool arrangement which includes a common transmitter unit and two receiver units.

FIG. 11 shows an alternative automatic tool arrangement 263, which operates similarly to the tool arrangement 250, with the two detectors 251 and 252 replaced with a single transmission unit 264 and two separate receiver units 265 and 266. In this embodiment, the transmitter unit 264 includes a homodyne oscillator 102, a PRF generator 104, two step generators 106 and 32, and RC circuit 33, and a transmit antenna 118, that are connected as described above (FIG. 7).

Each of the receiver units 265 and 266 includes a receive antenna 120, a sample and hold circuit 126, an AC coupled amplifier 129, a synchronous rectifier 130, a summer 36, a DC coupled amplifier 38, and a display 162, connected as described above in relation to FIG. 7. In one design, each of the receiver unit 265 and 266 includes a power-on-reset circuit 44, an integrator 48 and a calibrate switch 46, as shown in FIG. 7, or alternatively, these components could be shared between the two receiver units 265 and 266.

The transmit unit 264 is simultaneously connected to each receiver unit 265, 266, via a gating connection 267 and a rectifier connection 268 as illustrated in FIG. 11. The transmit unit 264 is preferably mounted half way between the receiver units 265, 266. It should however become clear that the transmitter unit 264 could be adjustably mounted on the tool or tool housing 255 between, or relative to the receiver units 265, 266. In the preferred embodiment, the transmit unit 264 sends out a common gate pulse to both receiver units 265, 266. The foregoing dual arrangements of FIGS. 10 and 11 can also be used for a more accurate location of hidden objects.

The foregoing description of the present invention has been presented for purposes of illustration and description. It is not intended to be exhaustive or to limit the invention to the precise forms described, and obviously many other modifications are possible in light of the above teaching.

What is claimed is:

1. An electromagnetic detector for locating an object behind a separator, comprising:

a signal generator for generating a sequence of pulses having a predetermined frequency;

a step generator connected to said signal generator for producing a sequence of transmit pulses;

a homodyne oscillator connected to said step generator for modulating said sequence of transmit pulses at a homodyne modulation frequency;

a transmit antenna connected to said step generator for transmitting said modulated sequence of transmit pulses in the direction of the separator;

a receive antenna for receiving reflected pulses from the object;

an averaging sample and hold (S/H) circuit connected to the receive antenna for sampling a plurality of reflected pulses to produce an average reflected signal;

a gating switch connected between the receive antenna and the S/H circuit and to the signal generator so that only reflected pulses from a selected range are sampled by the S/H circuit:

a DC bias rejection filter connected to the output of the S/H circuit for significantly reducing near wall proximity effect on said receive antenna;

a demodulator connected to the output of the DC bias rejection filter and to the homodyne oscillator to remove the homodyne modulation frequency from the reflected signal.

2. The detector according to claim 1, wherein said DC bias rejection filter comprises an AC coupled amplifier which filters out DC bias level shifts in said receive antenna.

3. The detector according to claim 2, wherein said demodulator comprises a rectifier circuit connected to said homodyne oscillator and to said AC coupled amplifier, for synchronously rectifying the reflected pulses to remove the homodyne modulation frequency.

4. The detector according to claim 3, wherein said homodyne oscillator modulates said sequence of transmit pulses with a continuous wave (CW) signal.

5. The detector according to claim 4, wherein said AC coupled amplifier operates with a passband centered on said CW signal.

6. The detector according to claim 5, wherein said homodyne oscillator operates at several kHz:

wherein said signal generator is a pulse repetition frequency (PRF) generator which operates in the range of 1 MHz to several MHz.

7. The detector according to claim 1, further comprising a DC coupled amplifier connected to the demodulator for amplifying the demodulated output of the S/H circuit.

8. The detector according to claim 7, further including a display connected to the amplifier.

9. The detector according to claim 8, wherein said display comprises a plurality of visual indicators that are sequentially energized in proportion to the voltage applied thereon; and wherein said applied voltage is linearly related to the magnitude of the reflected pulses.

10. The detector according to claim 1, further comprising an adjustable delay connected between the signal generator and gating switch for setting a predetermined detection range (range gating) from said transmit antenna.

11. The detector according to claim 10 further comprising a second step generator between the adjustable delay and gating switch.

12. An electromagnetic detector for locating a cavity within a separator, comprising:

a signal generator for generating a sequence of pulses having a predetermined shape and frequency;

a step generator connected to said signal generator for producing a sequence of transmit pulses:

a homodyne oscillator connected to said step generator for modulating said sequence of transmit pulses at a homodyne modulation frequency;

a transmit antenna connected to said step generator for transmitting said modulated sequence of transmit pulses through said separator;

a receive antenna for receiving reflected pulses from the cavity;

an averaging sample and hold (S/H) circuit connected to the receive antenna for sampling a plurality of reflected pulses to produce an average reflected signal;

a gating switch connected between the receive antenna and the S/H circuit; and to the signal generator so that only reflected pulses from a selected range are sampled by the S/H circuit:

a DC bias rejection filter for significantly reducing near wall proximity effect on said receive antenna;

said filter comprising an AC coupled amplifier connected to the output of the S/H circuit for filtering out DC bias level shifts in said receive antenna; and a rectifier circuit connected to said homodyne oscillator and to said AC coupled amplifier, for synchronously rectifying said reflected pulses to remove the homodyne modulation frequency.

13. The detector according to claim 12, further including a display connected to the output of the rectifier circuit and which comprises a plurality of indicators that are sequentially energized in proportion to the voltage applied thereon; and wherein said applied voltage is linearly related to the magnitude of said reflected pulses.

14. The detector according to claim 13, further comprising an adjustable delay connected between the signal generator and gating switch for setting a predetermined detection range (range gating) from said transmit antenna.

15. The detector according to claim 12, wherein said homodyne oscillator generates a homodyne signal which includes an arbitrary sequence of pulses having a mean frequency on the order of several kHz and a zero average.

16. An automated tool arrangement for use relative to an object behind a separator comprising in combination:

two or more generally identical detectors, mounted on a tool housing;

said detectors being distally separated from each other; and each of said detectors comprising:

a signal generator for generating a sequence of pulses having a predetermined shape and frequency;

a step generator connected to said signal generator for producing a sequence of transmit pulses:

a homodyne oscillator connected to said step generator for modulating said sequence of transmit pulses at a homodyne modulation frequency;

a transmit antenna connected to said step generator for transmitting said modulated sequence of transmit pulses through said separator;

a receive antenna for receiving reflected pulses from the object;

an averaging sample and hold (S/H) circuit connected to the receive antenna for sampling a plurality of reflected pulses to produce an average reflected signal:

a gating switch connected between the receive antenna and the S/H circuit and to the signal generator so that only reflected pulses from a selected range are sampled by the S/H circuit;

a DC bias rejection filter connected to the output of the S/H circuit for significantly reducing near wall proximity effect on said receive antenna;

a demodulator connected to the output of the DC bias rejection filter and to the homodyne oscillator to remove the homodyne modulation frequency from the reflected signal.

17. The automated tool arrangement according to claim 16, wherein said detectors are substantially symmetrically positioned relative to the object.

18. The automated tool arrangement according to claim 17, further including a tool which is activated as said detectors approach a desired position relative to an object.

19. The automated tool arrangement according to claim 18, wherein the tool is a nail gun.

20. An automated tool arrangement comprising in combination:

a transmitter unit;

two separate receiver units disposed generally equidistally on either side of said transmitter unit;

said transmitter unit and receiver units being mounted on a tool;

said transmitter unit comprising:

a PRF generator for producing a sequence of pulses;

a transmit pulse step generator connected to the PRF generator for generating a sequence of transmit pulses;

a homodyne oscillator connected to the transmit pulse step generator to modulate the sequence of transmit pulses;

a transmit antenna connected to the transmit pulse step generator for transmitting said modulated sequence of transmit pulses;

an adjustable delay connected to the PRF generator to produce a delayed sequence of pulses;

a gate pulse step generator connected to the adjustable delay;

a pulse differentiator connected to the gate pulse step generator to produce a sequence of gate pulses;

each receiver unit comprising:

a receive antenna for receiving reflected pulses from an object;

a sample and hold (S/H) circuit connected to the receive antenna for sampling a plurality of reflected pulses to produce an averaged detected signal;

an AC coupled amplifier connected to the output of the S/H circuit to subtract DC bias level shifts caused by near wall proximity effects on the receive antenna;

a synchronous rectifier connected to the output of the AC coupled amplifier and to the homodyne oscillator for demodulating the averaged detected signal:

a DC coupled amplifier connected to the output of the rectifier for producing an amplified demodulated detected signal;

a display connected to the DC coupled amplifier for displaying changes in the amplified demodulated detected signal;

wherein said transmit unit transmits a common gate pulse to both receiver units.

21. The automated tool arrangement according to claim 20, wherein said tool is activated as said transmit and receiver units approach a desired position relative to an object.

22. A method for detecting an object or cavity behind a separator, comprising:

generating a sequence of transmit pulses;

modulating said sequence of transmit pulses with a homodyne continuous wave (CW) signal at a homodyne modulation frequency;

transmitting said modulated sequence of transmit pulses in the direction of the separator;

receiving reflected pulses from the object or cavity;

averaging a plurality of reflected pulses to produce an averaged detected signal;

subtracting DC level shifts caused by near wall proximity effects on the receive antenna from the averaged detected signal;

demodulating the averaged detected signal to remove the homodyne modulation frequency.

* * * * *